United States Patent
Boehm et al.

(10) Patent No.: US 9,841,244 B2
(45) Date of Patent: Dec. 12, 2017

(54) HEAT EXCHANGER AND METHOD FOR ITS MANUFACTURE

(71) Applicant: Alfred Kärcher GmbH & Co. KG, Winnenden (DE)

(72) Inventors: Michael Boehm, Sulzbach (DE); Stefan Ehrhardt, Winnenden (DE); Siegmar Munz, Frankenhardt (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 456 days.

(21) Appl. No.: 14/072,101

(22) Filed: Nov. 5, 2013

(65) Prior Publication Data

US 2014/0054015 A1 Feb. 27, 2014

Related U.S. Application Data

(63) Continuation of application No. PCT/EP2011/057480, filed on May 10, 2011.

(51) Int. Cl.
*F28F 1/00* (2006.01)
*B21D 11/06* (2006.01)
(Continued)

(52) U.S. Cl.
CPC ............. *F28F 1/00* (2013.01); *B21D 11/06* (2013.01); *B21D 53/06* (2013.01); *B23P 15/26* (2013.01);
(Continued)

(58) Field of Classification Search
CPC .. F28F 1/00; F28F 9/0132; F28D 7/00; F28D 7/04; F28D 7/024; F28D 1/0213; F24H 1/165
(Continued)

(56) References Cited

U.S. PATENT DOCUMENTS 1,382,670 A * 6/1921 Price ................. F28D 7/024
165/145
1,614,242 A 1/1927 Hoyt
(Continued)

FOREIGN PATENT DOCUMENTS

CN 201476633 5/2010
DE 5679 10/1953
(Continued)

*Primary Examiner* — Len Tran
*Assistant Examiner* — Gustavo Hincapie Serna
(74) *Attorney, Agent, or Firm* — Womble Bond Dickinson (US) LLP (57) ABSTRACT

A heat exchanger for heating a liquid is provided, in particular, for high-pressure cleaners, including an inner and an outer heating coil which each have a plurality of turns, and including spacers which are arranged between the inner heating coil and the outer heating coil and are distributed over the circumference of the inner heating coil. To develop the heat exchanger in such a way that it can be manufactured more cost-effectively and is highly efficient, at least one turn of the outer heating coil includes between two spacers immediately adjacent to each other a first turn section in which the radial spacing from the inner heating coil is smaller or larger than in the region of the spacers. Two methods for manufacturing such a heat exchanger are also provided.

16 Claims, 7 Drawing Sheets

(51) Int. Cl.
   *B21D 53/06* (2006.01)
   *F24H 1/16* (2006.01)
   *B23P 15/26* (2006.01)
   *F24H 9/14* (2006.01)
   *F28D 7/02* (2006.01)
(52) U.S. Cl.
   CPC .............. *F24H 1/165* (2013.01); *F24H 9/146* (2013.01); *F28D 7/024* (2013.01); *F28F 2240/00* (2013.01); *Y10T 29/4935* (2015.01)
(58) Field of Classification Search
   USPC ........ 165/154, 156, 162, 163, 172; 122/247, 122/249, 31.1, 18.1; 126/522, 365.1, 126/378.1
   See application file for complete search history.

(56) References Cited

U.S. PATENT DOCUMENTS

| | | | | |
|---|---|---|---|---|
| 1,618,434 | A | | 2/1927 | Humphrey |
| 1,650,919 | A | | 11/1927 | Wilcox |
| 1,839,392 | A | * | 1/1932 | Humphrey .............. F24H 1/165 122/14.2 |
| 2,054,537 | A | * | 9/1936 | Gamble .................. F24H 1/165 122/18.4 |
| 2,530,519 | A | * | 11/1950 | Guggenheim ........... A23G 3/04 165/162 |
| 2,998,807 | A | | 9/1961 | Clarkson et al. |
| 3,051,146 | A | | 8/1962 | Clarkson et al. |
| 3,448,792 | A | * | 6/1969 | Thompson ............ F28D 1/0213 122/15.1 |
| 3,509,939 | A | * | 5/1970 | Weber ....................... F22B 1/16 122/510 |
| 3,526,273 | A | * | 9/1970 | Wentworth, Jr. ....... F28D 7/022 165/160 |
| 3,639,963 | A | * | 2/1972 | Maher .................. B21D 53/027 165/162 |
| 3,653,796 | A | * | 4/1972 | Kercher .................. F24H 1/165 431/328 |
| 3,841,273 | A | * | 10/1974 | Finger ....................... F24H 1/43 122/248 |
| 4,451,960 | A | * | 6/1984 | Molitor ................ B21D 53/027 165/165 |
| 4,495,989 | A | * | 1/1985 | Sievers .................. B21D 11/06 165/163 |
| 4,557,323 | A | * | 12/1985 | Hardy ..................... F28D 7/028 122/18.4 |
| 5,845,609 | A | | 12/1998 | Corrigan |
| 6,640,583 | B2 | * | 11/2003 | Hancock ................... F24F 1/14 165/144 |
| 2009/0020265 | A1 | | 1/2009 | Feinauer et al. |

FOREIGN PATENT DOCUMENTS

| | | | |
|---|---|---|---|
| DE | 1 012 050 | | 7/1957 |
| DE | 1 972 233 | | 11/1967 |
| DE | 35 10 049 | | 10/1986 |
| DE | 93 10 430.8 | | 9/1993 |
| EP | 0 248 282 | | 12/1987 |
| EP | 1 255 085 | | 11/2002 |
| FR | 2542854 | | 9/1984 |
| FR | 0505293 A1 * | 5/2005 | ............... F28F 1/00 |
| JP | EP 1724543 A1 * | 11/2006 | ............. F28D 7/028 |

* cited by examiner

HEAT EXCHANGER AND METHOD FOR ITS MANUFACTURE

CROSS-REFERENCE TO RELATED APPLICATIONS

This application is a continuation of international application number PCT/EP2011/057480, filed on May 10, 2011, which is incorporated herein by reference in its entirety and for all purposes.

BACKGROUND OF THE INVENTION

The invention relates to a heat exchanger for heating a liquid, in particular, for high-pressure cleaners, comprising an inner and an outer heating coil which each have a plurality of turns, and comprising spacers which are arranged between the inner heating coil and the outer heating coil and are distributed over the circumference of the inner heating coil.

The invention also relates to methods for manufacturing such a heat exchanger, wherein an inner heating coil is wound from a pipe, several spacers distributed over the circumference of the inner heating coil are arranged and fixed on the outer side of the inner heating coil, and an outer heating coil is wound from the pipe onto the spacers.

Such heat exchangers are used, in particular, for heating a cleaning liquid for high-pressure cleaners. The heat exchangers form a double-pipe spiral comprising an inner and an outer heating coil. The inner heating coil defines a combustion chamber in which a fuel nozzle can be positioned. This makes it possible to ignite a flame in the combustion chamber, so that hot air flows around the heat exchanger. The cleaning liquid can flow through the heat exchanger. Heat transfer then takes place from the hot air via the heating coils to the liquid to be heated, which can then be directed at an article to be cleaned.

The heat exchangers are therefore used as continuous flow heaters. To improve the efficiency of the heat exchangers, it is proposed in EP 1 255 085 B1 that the spacers be configured in such a way with different radial recesses for the turns of the outer heating coil that the turns are arranged at least partially in radially offset relation to one another. This enables improved heat transfer from the heated air to the heating coils. However, this requires use of a large number of specially designed spacers, the positioning of which on the outer side of the inner heating coil must be carefully selected.

The object of the present invention is to provide a heat exchanger of the generic kind and a method for its manufacture, thereby enabling the heat exchanger to be manufactured more cost-effectively and to be highly efficient.

SUMMARY OF THE INVENTION

This object is accomplished, in accordance with invention, in a heat exchanger of the kind described at the outset in that at least one turn of the outer heating coil comprises between two spacers immediately adjacent to each other a first turn section in which the radial spacing from the inner heating coil is smaller or larger than in the region of the spacers.

Therefore, in relation to the circumferential direction of the heat exchanger, at least in the region of a turn of the outer heating coil, the radial spacing which the turn assumes from the inner heating coil varies. Whereas the radial spacing of the turn in the region of the spacers may have a certain value which is predetermined by the configuration of the spacers, the radial spacing in at least a first turn section between two spacers immediately adjacent to each other changes. Therefore, at least one turn of the outer heating coil has, at least in a first turn section between two spacers immediately adjacent to each other, a smaller or a larger radial spacing from the inner heating coil than in the region of the spacers.

It has been found that owing to the varying radial spacing along the circumference between the spacers, which the at least one turn of the outer heating coil assumes from the inner heating coil, the heat transfer can be improved between the heated air and the liquid flowing through the heat exchanger, with the result that the heat exchanger is highly efficient.

It is advantageous if several turns of the outer heating coil each comprise between two spacers immediately adjacent to each other a first turn section in which the spacing from the inner heating coil is smaller or larger than in the region of the spacers. It may, for example, be provided that a first turn of the outer heating coil assumes a spacing from the inner heating coil which is constant over the circumference of the heat exchanger, whereas a second turn following the first turn in the winding direction of the outer heating coil assumes a radial spacing from the inner heating coil which varies over the circumference of the heat exchanger. The second turn can be followed in the winding direction by a third turn of the outer heating coil, which again assumes a spacing from the inner heating coil which is constant over the circumference of the heat exchanger, thereby corresponding to the first turn. The third turn of the outer heating coil can then be followed by a fourth turn, the spacing of which from the inner heating coil varies over the circumference of the heat exchanger.

Insofar as several turns of the outer heating coil have in a respective first turn section between two spacers immediately adjacent to each other a smaller or larger radial spacing from the inner heating coil than in the region of the spacers, it is advantageous if the first turn sections of at least two turns are arranged so as to be offset from each other in the circumferential direction of the outer heating coil. In relation to the longitudinal axis of the heat exchanger, a first turn section of a first turn of the outer heating coil can be positioned in a first angular range, and the first turn section of a second turn of the outer heating coil can be positioned in a second angular range which is arranged in offset relation to the first angular range in the circumferential direction.

In an advantageous embodiment, the first turn sections of at least two turns are arranged so as to be offset from each other through 270°. Such a configuration is advantageous particularly when the heat exchanger has a total of four spacers which are arranged in uniformly distributed relation to one another in the circumferential direction.

If several turns of the outer heating coil have in a respective first turn section between two spacers immediately adjacent to each other a smaller or larger radial spacing from the inner heating coil than in the region of the spacers, then it may be provided that the first turn sections of the turns are arranged in the same circumferential region of the outer heating coil. In such a configuration of the invention, several turns of the outer heating coil may each comprise in a common circumferential region between two spacers immediately adjacent to each other a turn section in which the radial spacing is larger or smaller than in the region of the two spacers. In particular, it may be provided that several turns of the outer heating coil following one another in the winding direction each comprise in the same circumferential region a first turn section in which the spacing from the inner heating coil is smaller or larger than in the region of the spacers which delimit the first turn section. The first turn sections can therefore be arranged next to one another in a row in relation to the longitudinal axis of the heat exchanger.

In a preferred configuration of the heat exchanger in accordance with the invention, at least one turn of the outer heating coil comprises two turn sections following each other in the circumferential direction, which are each arranged between two spacers immediately adjacent to each other and in which the turn assumes different radial spacings from the inner heating coil. Each turn of the outer heating coil extends over a circumferential area of 360° in total. This circumferential area is divided up by the spacers, and at least one turn of the outer heating coil comprises two sections following each other in the circumferential direction, which are each arranged between two spacers and in which the turn assumes different radial spacings from the inner heating coil. However, such a variation in spacing need not necessarily be used in all of the turns of the outer heating coil. It may instead be provided that the outer heating coil comprises in addition to turns with a radial spacing from the inner heating coil that varies over the circumference further turns characterized by a spacing from the inner heating coil that remains constant over the circumference.

It may be provided that at least one turn of the outer heating coil has in a first turn section between two spacers immediately adjacent to each other in the circumferential direction a smaller radial spacing from the inner heating coil than in the region of the two spacers, and that the first turn section is followed in the circumferential direction of the outer heating coil by a second turn section in which the radial spacing from the inner heating coil is larger than in the region of the spacers.

It is expedient if the spacers define over their entire length a constant spacing between the inner and the outer heating coil. This enables particularly simple assembly of the spacers and has the further advantage that the positioning of the spacers on the outer circumference of the inner heating coil does not have to be specified exactly.

The spacers of the heat exchanger are preferably of identical configuration. This facilitates manufacture and assembly of the heat exchanger and, consequently, allows a further reduction in costs.

The radial spacing which the outer heating coil assumes from the inner heating coil in the at least one first turn section is expediently at least 10% of the radial spacing which the outer heating coil assumes from the inner heating coil in the region of the spacers delimiting the first turn section.

The radial spacing which the outer heating coil assumes from the inner heating coil in the first turn section is preferably at most 200% of the radial spacing which the outer heating coil assumes from the inner heating coil in the region of the spacers delimiting the first turn section.

In an advantageous embodiment, the radial spacing which the outer heating coil assumes in the region of at least one turn varies between at least 10% and at most 200% of the spacing which the outer heating coil assumes in the region of the spacers.

In a particularly preferred configuration of the heat exchanger in accordance with invention, the inner heating coil is of circular-cylindrical configuration. The turns of the inner heating coil, therefore, extend concentrically around the longitudinal axis of the heat exchanger and define a cylindrical combustion chamber.

The spacers are preferably welded to the outer side of the inner heating coil.

It is advantageous if the outer heating coil comprises a first partial longitudinal region in which the at least one first turn section is arranged, and the first partial longitudinal region is followed in the longitudinal direction of the outer heating coil by a second partial longitudinal region in which the outer heating coil has a constant spacing from the inner heating coil.

The first partial longitudinal region expediently extends at most over 75% of the total length of the outer heating coil.

It is advantageous if the turns of the inner heating coil which are arranged at the level of the first partial longitudinal region lie directly against one another.

In an advantageous configuration of the invention, at least some of the turns of the inner heating coil which are arranged at the level of the second partial longitudinal region are arranged at an axial spacing from one another.

Preferably, at least some turns of the outer heating coil in the first partial longitudinal region are arranged at an axial spacing from one another. The axial spacing between the turns of the outer heating coil in the first partial longitudinal region may, for example, be at least 3 mm and at most 30 mm.

The outer heating coil, like the inner heating coil, is wound from a pipe. It is expedient if a least two turns of the outer heating coil in the first partial longitudinal region are arranged at an axial spacing from each other which is at least as large as the outer diameter of the pipe.

As mentioned at the outset, the heat exchanger in accordance with the invention is configured in the form of a double-pipe spiral. An inner heating coil is wound from a pipe, and several spacers distributed over the circumference of the inner heating coil are arranged and fixed on the outer side of the inner heating coil. The spacers extend in the longitudinal direction of the inner heating coil, and an outer heating coil is wound from the pipe onto the spacers.

The object mentioned at the outset is accomplished in a first manufacturing method in accordance with the invention in that at least one turn of the outer heating coil in a first turn section between two spacers immediately adjacent to each other is deformed in the direction towards the inner heating coil. In this method in accordance with invention, a double-pipe spiral is first formed in a manner known per se. Subsequently, at least one turn of the outer heating coil in the region between two spacers immediately adjacent to each other is deformed in the direction towards the inner heating coil. In the region between the spacers, the at least one turn, therefore, assumes a smaller radial spacing from the inner heating coil than in the region of the spacers. A pressing device with a press ram may be used for the deformation. The press ram is preferably positioned halfway between two spacers immediately adjacent to each other on at least one turn of the outer heating coil and subsequently moved in the direction towards the inner heating coil, preferably in the radial direction, so that the turn is deformed.

During the deformation, the turn acted upon by the deformation force is supported on the spacers. The consequence of deformation of a turn in the region between two spacers is that the turn assumes in the region between the two spacers a smaller spacing and in the immediately adjacent regions beyond the two spacers a larger spacing from the inner heating coil than in the region of the spacers. An oval shape is, therefore, imparted to at least one turn of the initially cylindrical outer heating coil by the deformation operation. In the region between two spacers immediately adjacent to each other, the turn assumes a smaller radial spacing than in the region of the spacers, and in the regions immediately adjoining each of the two spacers the turn undergoes deformation radially outwardly so that its spacing from the inner heating coil increases.

Preferably, several turns of the outer heating coil in a respective first turn section between two spacers immediately adjacent to each other are simultaneously deformed in the direction towards the inner heating coil. For this purpose, a press ram may be used, the shape and dimensions of which are adapted in such a way to the shape of the outer heating coil that several turns of the outer heating coil can be simultaneously deformed during a deformation operation. The deformed turns may follow one another directly in the winding direction of the outer heating coil. It may, however, also be provided that one or more undeformed turns are arranged at least between two deformed turns of the outer heating coil.

It is advantageous if after deformation of at least one turn the heat exchanger is turned about the longitudinal axis of the heat exchanger, and subsequently at least one further turn of the outer heating coil in a first turn section between two spacers immediately adjacent to each other is deformed in the direction towards the inner heating coil. In such an embodiment of the method in accordance with the invention, the outer heating coil is deformed at least twice in succession, and it is turned about the longitudinal axis of the heat exchanger after the first deformation operation. An oval shape is imparted to individual turns of the outer heating coil by the deformation, the first turn sections of at least two turns being arranged so as to be offset from each other in the circumferential direction of the outer heating coil.

After a first deformation operation, the heat exchanger is expediently turned through an angle of 270° about its longitudinal axis in order to subsequently undergo deformation again.

It may also be provided that after deformation of at least one turn, the heat exchanger is displaced relative to a press ram in the direction of the longitudinal axis of the heat exchanger, and subsequently at least one further turn of the outer heating coil in a first turn section between two spacers immediately adjacent to each other is deformed in the direction towards the inner heating coil. It is, therefore, possible to provide deformed turn sections in the same circumferential region of the outer heating coil in several deformation operations between each of which the heat exchanger is axially displaced relative to the press ram. In particular, this makes it possible to deform only a single turn during each deformation operation. Subsequently, the heat exchanger can then be axially displaced in order to deform a further turn in the region between two spacers immediately adjacent to each other.

It is advantageous if after deformation of a turn, the heat exchanger is axially displaced relative to the press ram to such an extent that at least one undeformed turn, i.e., a turn which does not undergo any deformation, extends between the turn already deformed and a turn to be subsequently deformed.

It is expedient for the spacers to be arranged so as to be uniformly distributed over the circumference of the inner heating coil. In particular, it may be provided that a total of four spacers are used, which are arranged so as to be offset through 90° from one another in the circumferential direction.

It is expedient for the spacers to be of identical construction.

The spacers preferably define over their entire length a constant spacing between the inner and the outer heating coil.

As mentioned above, it is advantageous if the spacers are welded to the inner heating coil.

It may be provided that at least some turns of the outer heating coil are welded to the spacers.

As has already been stated, a press ram is preferably used for deforming at least one turn of the outer heating coil. The press ram may be of such design that individual or several turns of the outer heating coil are deformed, and the press-in depth per pressing operation and turn may vary. It may, however, also be provided that the press-in depth is constant.

Surprisingly, it has been found that a high precision and dimensional accuracy of the deformation plays a secondary role. The efficiency of the heat exchanger is increased by the deformation of at least one turn in at least one first turn section between two spacers. Owing to the irregular shape of the outer heating coil, the heated air is whirled better and the heat transfer thereby improved.

The spacers may be fixed to the inner heating coil with a small number of weld spots. The reduced number of weld spots results in an increased service life as thermal stresses can be kept low.

The turns of the inner and/or outer heating coil are expediently supported with positive locking on the spacers.

The position, number and configuration of the deformations of the preferably initially circular-cylindrical outer heating coil may be varied within wide ranges in order to optimize the efficiency of the heat exchanger. In particular, the deformation may be adapted to the shape of a boiler in which the heat exchanger is to be positioned.

Instead of deforming the outer heating coil subsequently in at least one turn section between two spacers immediately adjacent to each other, in a second method in accordance with the invention for manufacturing the heat exchanger mentioned at the outset, when manufacturing the outer heating coil, the pipe used is wound, in at least one turn section between two spacers immediately adjacent to each other, onto the inner heating coil at a spacing from the inner heating coil which is larger or smaller than the spacing which the pipe assumes in the region of the spacers from the inner heating coil. In such a manufacturing method, the spacing in the region between at least two spacers immediately adjacent to each other is, therefore, already varied during the winding-on of the outer heating coil. This has the advantage that a subsequent deformation operation may be dispensed with.

The variation in the radial spacing between the outer heating coil and the inner heating coil when winding on the outer heating coil may, for example, be achieved by exerting on the pipe during the winding onto the inner heating coil a tensile stress which is chosen so as to be greater or less in the region of at least one first turn section between two spacers immediately adjacent to each other than in the adjacent turn sections. To reduce the radial spacing, a greater tensile stress can be exerted on the pipe in the region between two spacers than in the turn sections before and after these two spacers. If the radial spacing is to be increased, then the tensile stress exerted on the pipe during the winding onto the inner heating coil can be reduced.

It may also be provided that when winding the pipe onto the inner heating coil, winding aids are used, the shape of which is selected such that at least one turn of the outer heating coil in at least one first turn section has a smaller or larger spacing from the inner heating coil than in the region of the spacers. The winding aids may, for example, be crescent-shaped with different radii of curvature. Alternatively, it may also be provided that the winding aids are of identical construction and, therefore, prescribe a constant spacing between the inner and the outer heating coil, but that when winding the pipe onto the inner heating coil, the winding aids are dispensed with in the region of individual turn sections between two spacers immediately adjacent to each other, so that a smaller radial spacing from the inner heating coil results in these turn sections.

The following description of a preferred embodiment of the invention serves for a more detailed explanation in conjunction with the drawings.

DETAILED DESCRIPTION OF THE INVENTION

Figure 1:
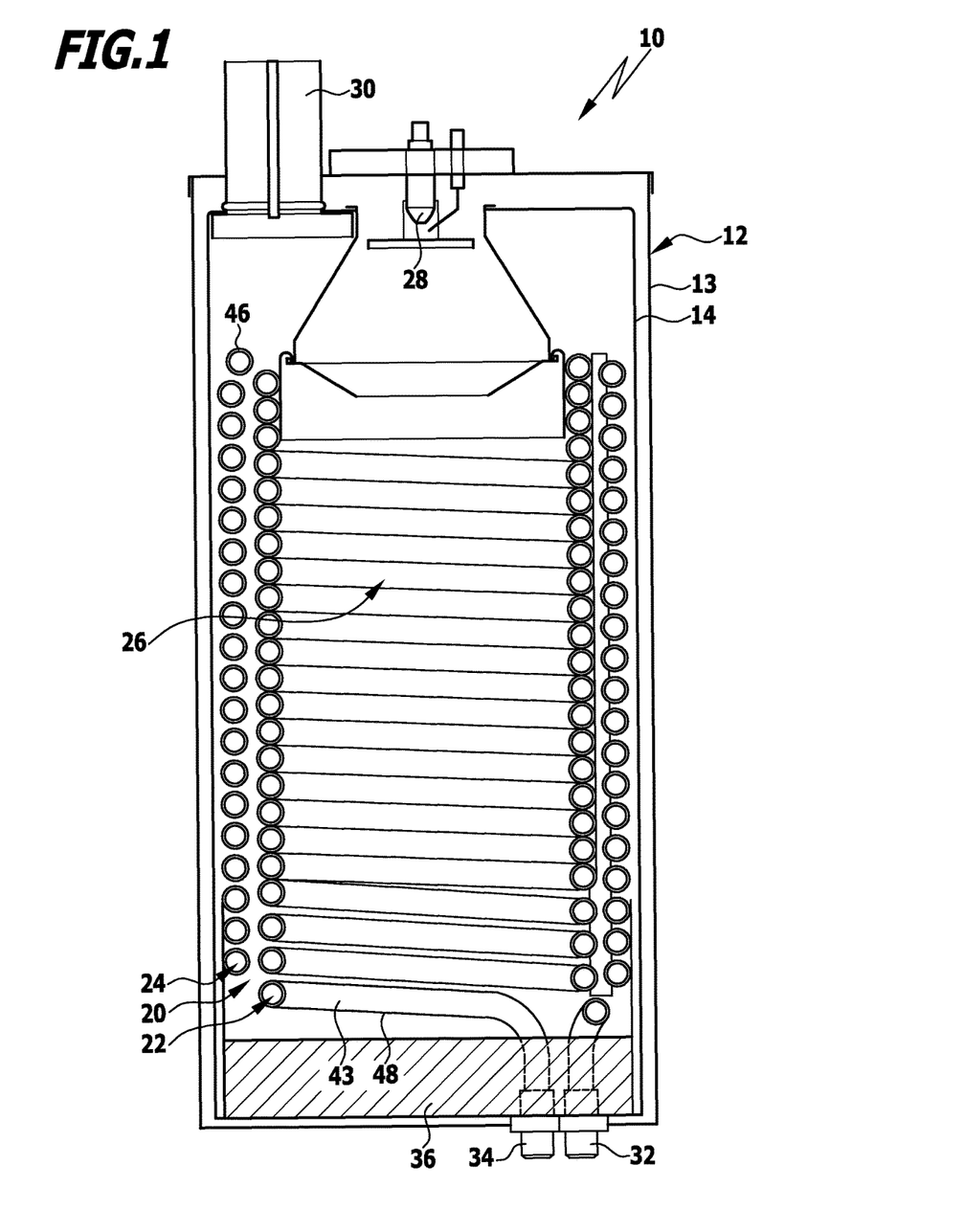
FIG. 1 shows a schematic sectional view though a burner for a high-pressure cleaner with a heat exchanger in accordance with the invention.
Figure 2:
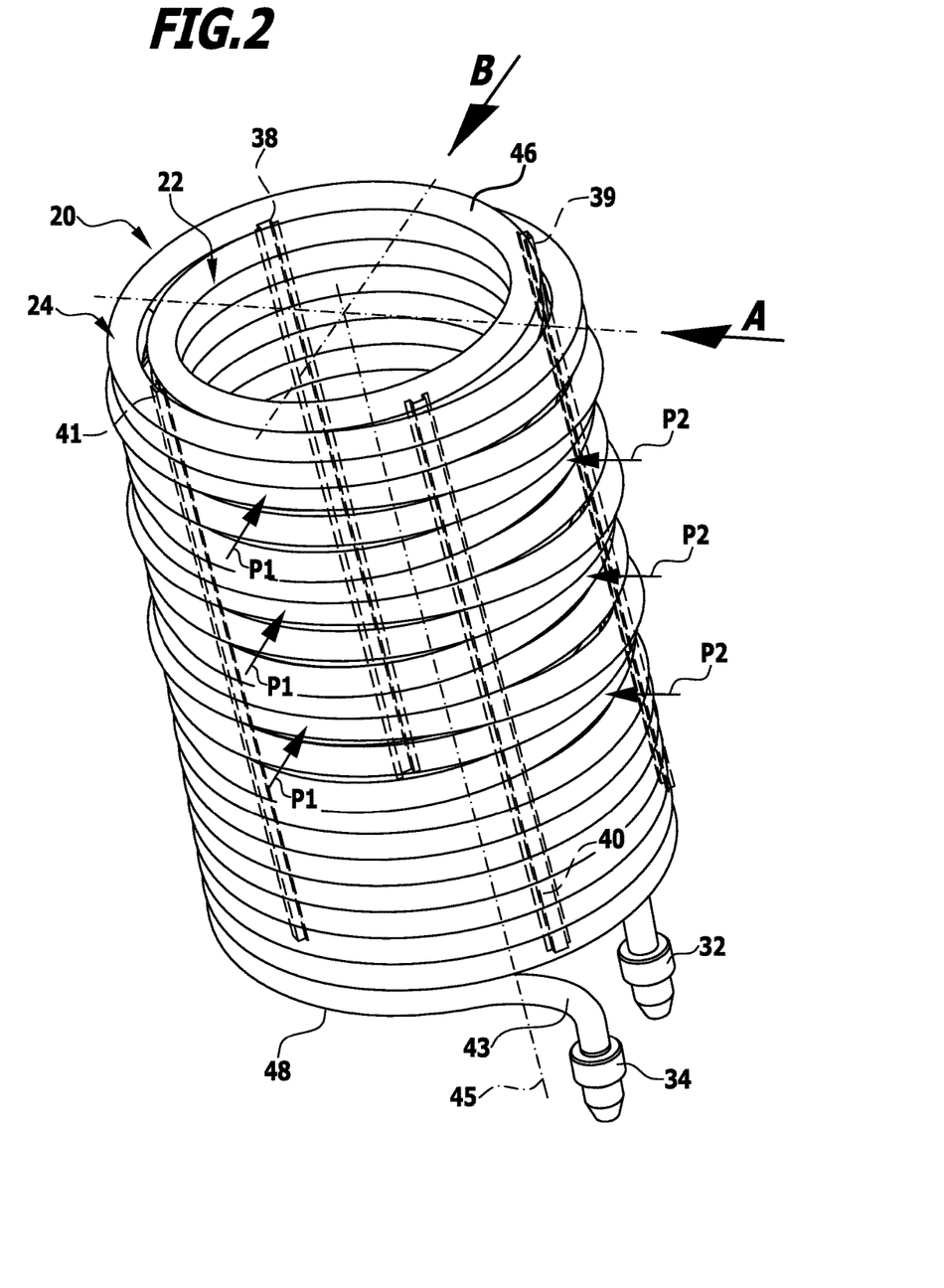
FIG. 2 shows a perspective representation of the heat exchanger from FIG. 1.
Figure 3:
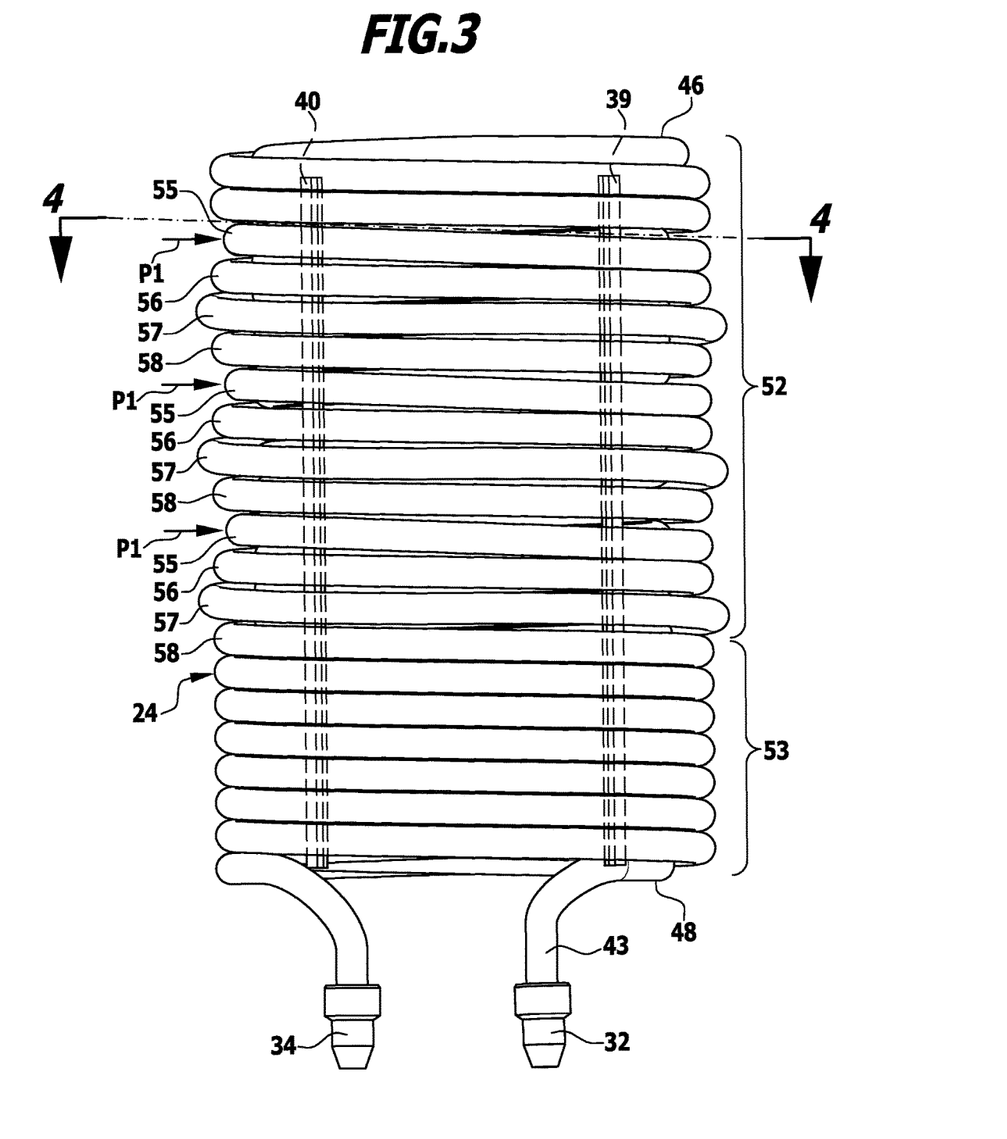
FIG. 3 shows a side view of the heat exchanger in the direction of arrow A from FIG. 2.

FIG. 1 shows schematically a burner 10 in the form of a continuous flow heater, which may be used in a high-pressure cleaner in order to heat a cleaning liquid, preferably water, to a desired temperature. The burner 10 comprises a cylindrical boiler 12 with an outer wall 13 and an inner wall 14. Arranged in the boiler 12 is a heat exchanger 20 in accordance with the invention, which is configured in the form of a double-pipe spiral and comprises an inner heating coil 22 and an outer heating coil 24, which are wound from a metal pipe 43. This will be explained in greater detail hereinbelow.

The inner heating coil 22 surrounds a combustion chamber 26. Arranged in an upper side of the boiler 12 is a burner nozzle 28 which can be supplied with a fuel in the usual way, which is therefore not shown in the drawings, so that a flame can be ignited in the combustion chamber 26. Fresh air can be supplied to the combustion chamber 26 via an air inlet pipe, not shown in the drawings, which is known per se to one skilled in the art, and the exhaust gases can be discharged via an exhaust pipe 30 arranged next to the burner nozzle 28.

During operation of the burner, the cleaning liquid to be heated flows through the heat exchanger 20. The liquid to be heated is supplied to the heat exchanger via a first connection 32, and the heated liquid can be discharged from the heat exchanger via a second connection 34. The two connections 32 and 34 are arranged on a base plate 36 of the boiler 12 that faces away from the burner nozzle 28.

A total of four spacers 38, 39, 40 and 41 are arranged between the inner heating coil 22 and the outer heating coil 24. These are of identical construction and each extend over the entire length of the inner heating coil 22. They are arranged and uniformly distributed over the circumference of the inner heating coil 22, so that two spacers immediately adjacent to each other in the circumferential direction respectively define between them an angular range of 90°.

As previously mentioned, the two heating coils 22, 24 are wound from a pipe 43. In a first step, the cylindrical inner heating coil 22 is wound from the pipe 43. The spacers 38, 39, 40 and 41 are subsequently welded to the outer side of the inner heating coil 22. In a first manufacturing method in accordance with the invention, the outer heating coil 24 is then wound onto the spacers 38, 39, 40 and 41, so that the outer heating coil 24 initially has, like the inner heating coil 22, a cylindrical shape with a plurality of circular-cylindrical turns, each extending over 360° in the circumferential direction. It may be provided that individual or all turns of the outer heating coil 24 are welded to the spacers 38 to 41.

In the first manufacturing method in accordance with the invention, the outer heating coil 24 is subsequently subjected to a first pressing operation and a second pressing operation, and between the two pressing operations it is turned through 270° about the longitudinal axis 45 of the heat exchanger 20 and offset by two turns in the axial direction. This is shown schematically in FIGS. 3 to 6.

The outer heating coil 24 comprises a first partial longitudinal region 52, which extends in the longitudinal direction from the upper side 46 of the heat exchanger 20 that faces the burner nozzle 28 over approximately 75% of the total length of the heat exchanger 20 in the direction of the underside 48 that faces away from the burner nozzle 28, and in which the turns of the outer heating coil are arranged at an axial spacing from one another. The first partial longitudinal region 52 is followed by a second partial longitudinal region 53, which extends as far as the underside 48 and in which the turns of the outer heating coil lie against one another. In the first partial longitudinal region 52, the turns of the outer heating coil 24 can be combined into several groups of turns with four turns each. Each group of turns comprises a first turn 55, a second turn 56, a third turn 57 and a fourth turn 58. A first pressing operation is performed such that the outer heating coil 24 is supported in the region of the first spacer 38 and the second spacer 39 by a first support 61 and a second support 62, which are placed against the outer side of the outer heating coil 24. Using a press ram 63, all of the first turns 55 of the groups of turns of the first partial longitudinal region 52 of the outer heating coil 24 are then simultaneously deformed at the center of the area between the third spacer 40 and the fourth spacer 41 radially inwardly in the direction towards the longitudinal axis 45. The press ram 63 is of such configuration that it can simultaneously engage all first turns 55 in the first partial longitudinal region 52 and deform these radially inwardly in a respective first turn section 64 extending between the third spacer 40 and the fourth spacer 41. After the deformation, the outer heating coil 24 assumes in the first turn section 64 a smaller radial spacing from the inner heating coil 22 than in the region of the third spacer 40 and the fourth spacer 41. The consequence of the radially inwardly directed deformation in the region of the first turn section 64 is that the radial spacing which the outer heating coil 24 assumes from the inner heating coil 22 increases in a second turn section 66 following the first turn section 44 in the circumferential direction and in a fourth turn section 70 preceding the first turn section 64 in the circumferential direction, whereas the radial spacing between the outer heating coil 24 and the inner heating coil 22 remains practically the same in the third turn section 68 diametrically opposed to the first turn section 64 owing to the support by the first support 61 and the second support 62. The second turn section 66 of the first turns 55 that follows the first turn section 64 in the circumferential direction extends between the fourth spacer 41 and the first spacer 38 following it in the circumferential direction. The fourth turn section 70 of the first turns 55 that immediately precedes the first turn section 64 extends between the second spacer 39 and the third spacer 40, and the third turn section 68 of the first turns 55 that is diametrically opposed to the first turn section 64 extends between the first spacer 38 and the second spacer 39 following it in the circumferential direction. This will be clear from FIG. 4.

In the first pressing operation in which the first turn section 64 of the first turns 55 is acted upon with the pressing force indicated by arrow P1 in the drawings, the outer heating coil 24 therefore undergoes oval deformation in the region of the first turns 55. In the illustrated embodiment of the invention, the radial spacing between the outer heating coil 24 and the inner heating coil 22 in the first turn section 64 is at least 10% of the spacing between the two heating coils 24, 22 in the region of the spacers 38 to 41. In the region of the second turn section 66 and also in the region of the fourth turn section 70, the radial spacing between the two heating coils 24, 22 in the illustrated embodiment is at most 200% of the radial spacing assumed by the heating coils in the region of the spacers 38 to 41. For a better overview, the variation in the spacing of the outer heating coil 24 over the circumference of the heat exchanger 20 is shown enlarged in the drawings.

Figure 4:
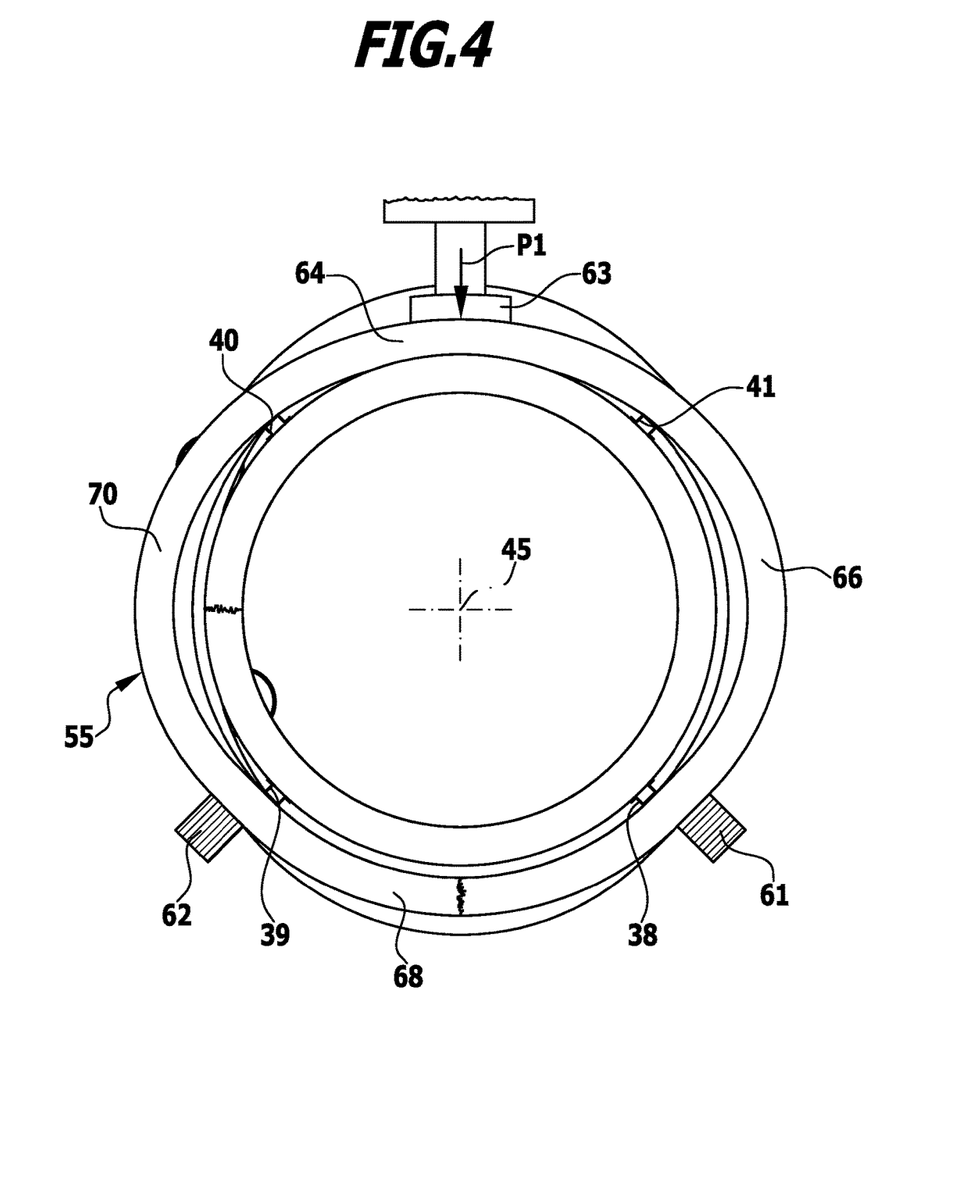
FIG. 4 shows a sectional view taken along line 4-4 in FIG. 3 during manufacture of the heat exchanger.
Figure 5:
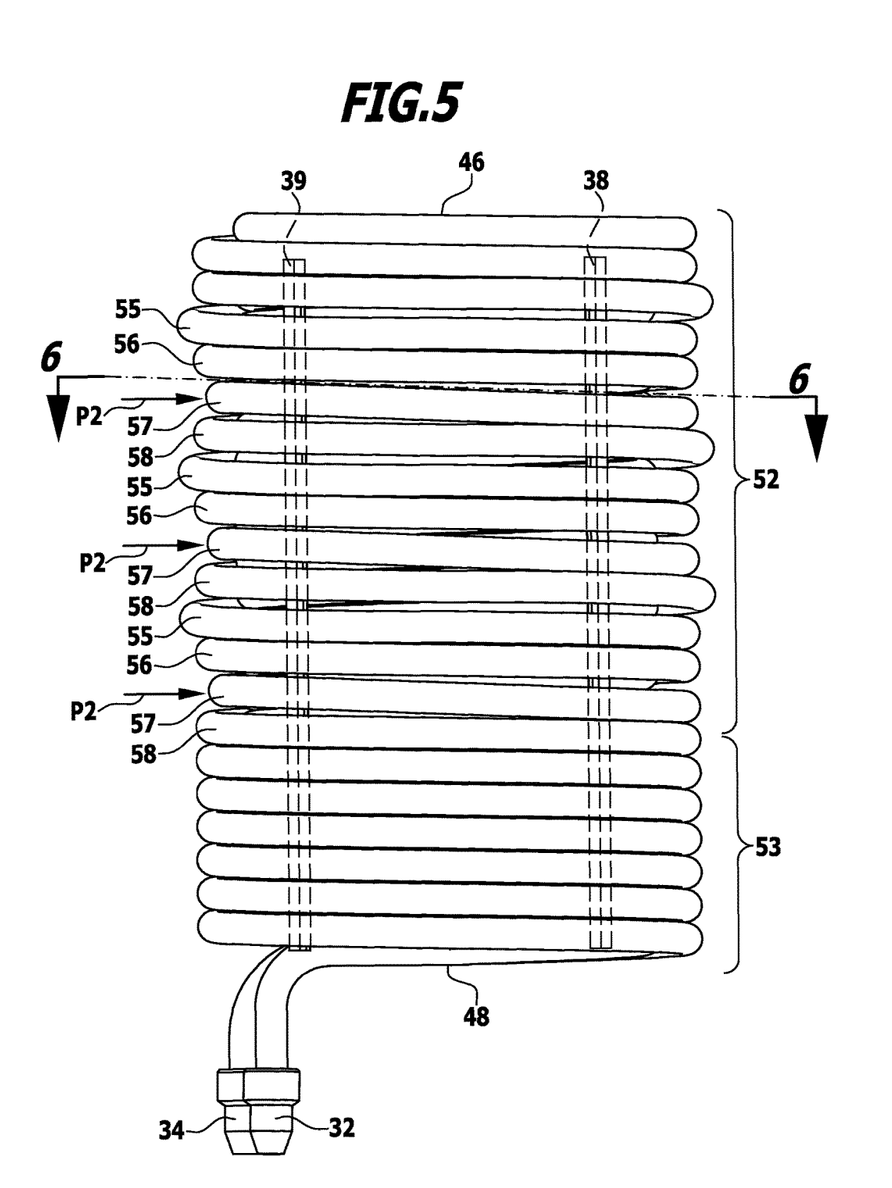
FIG. 5 shows a side view of the heat exchanger in the direction of arrow B from FIG. 2.
Figure 6:
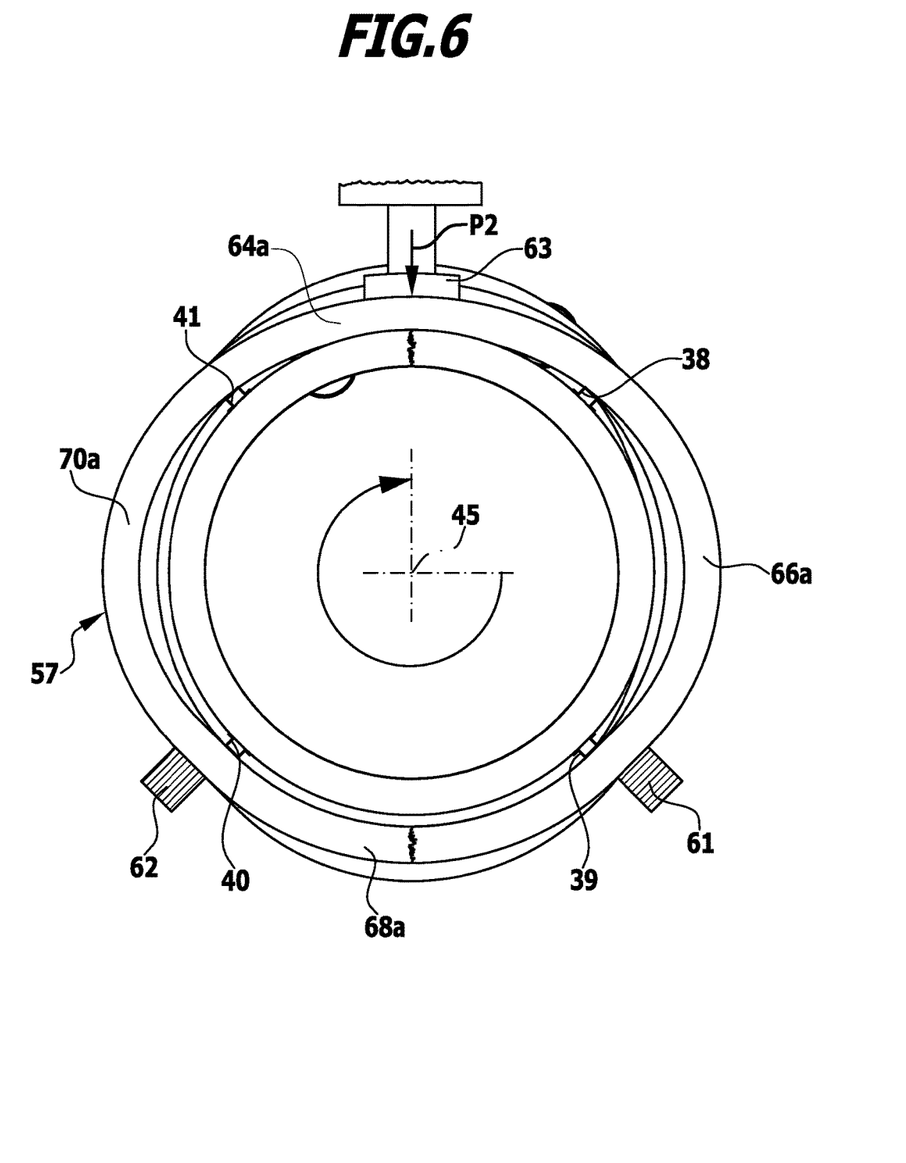
FIG. 6 shows a sectional view taken along line 6-6 in FIG. 5 during manufacture of the heat exchanger.

After the outer heating coil 24 has been subjected to the first pressing operation, as shown in FIG. 4, the heat exchanger 20 is turned through 270° about its longitudinal axis 45 and axially offset relative to the press ram 63 to such an extent that subsequently each third turn 57 of the groups of turns of the first partial longitudinal region 52 of the outer heating coil 24 is subsequently acted upon by the press ram 63 with a pressing force P2 directed radially in the direction towards the longitudinal axis 45 in a first turn section 64a which is offset in the circumferential direction through 270° in relation to the first turn section 64 of the first turns 55. Owing to the turning though 270°, the outer heating coil 24 is supported during the second pressing operation in the region of the second spacer 39 and the third spacer 40 on the supports 61 and 62, and the first turn section 64a of the third turns 57, against which the press ram 63 lies, is delimited by the fourth spacer 41 and the first spacer 38. In this first turn section 64a, the outer heating coil 24 assumes after the second pressing operation a smaller radial spacing from the inner heating coil 22 than in the region of the spacers 41 and 38. By contrast, the radial spacing from the inner heating coil 22 increases in the second turn section 66a of the third turns 57, which is arranged between the first spacer 38 and the second spacer 39, and also in the fourth turn section 70a of the third turns 57, which is arranged between the third spacer 40 and the fourth spacer 41. The third turn section 68a of the third turns 57 is arranged between the second spacer 39 and the third spacer 40 and owing to the support by the supports 61 and 62 undergoes practically no radial deformation.

Manufacture of the heat exchanger 20 has been completed when the heat exchanger 20 has undergone both pressing operations. In the first partial longitudinal region 52, the first and third turns 55, 57 of the groups of turns of the outer heating coil 24 have turn sections with a radial spacing from the inner heating coil 22 which is larger or smaller than the spacing which the turns assume in the region of the spacers 38 to 41 from the inner heating coil 22. The radial spacing which the first and third turns 55, 57 assume from the inner heating coil 22 therefore varies over the circumference of the heat exchanger 20. The turn sections 64a of the third turns 55 having a smaller radial spacing are arranged offset in the circumferential direction in relation to the turn sections 64 of the first turns 55 having a smaller radial spacing. There are also turns in the first partial longitudinal region 52, which have a constant spacing from the inner heating coil 22 along the circumference of the heat exchanger 20. These are the second and fourth turns 56, 58 of the groups of turns explained hereinabove. The turns of the outer heating coil 24 are arranged at an axial spacing from one another in the first partial longitudinal region 52. The turns of the inner heating coil 22 at the level of the first partial longitudinal region 52 lie directly against one another and are of circular shape.

In the second partial longitudinal region 53, the turns of the outer heating coil 24 are not deformed in the radial direction in the aforementioned manner. They, therefore, have a constant spacing from the inner heating coil 22 over the circumference of the heat exchanger 20. In the second partial longitudinal region 53, the turns of the outer heating coil 24 lie against one another. The turns of the inner heating coil 22 are spaced from one another in the second partial longitudinal region 53.

Figure 7:
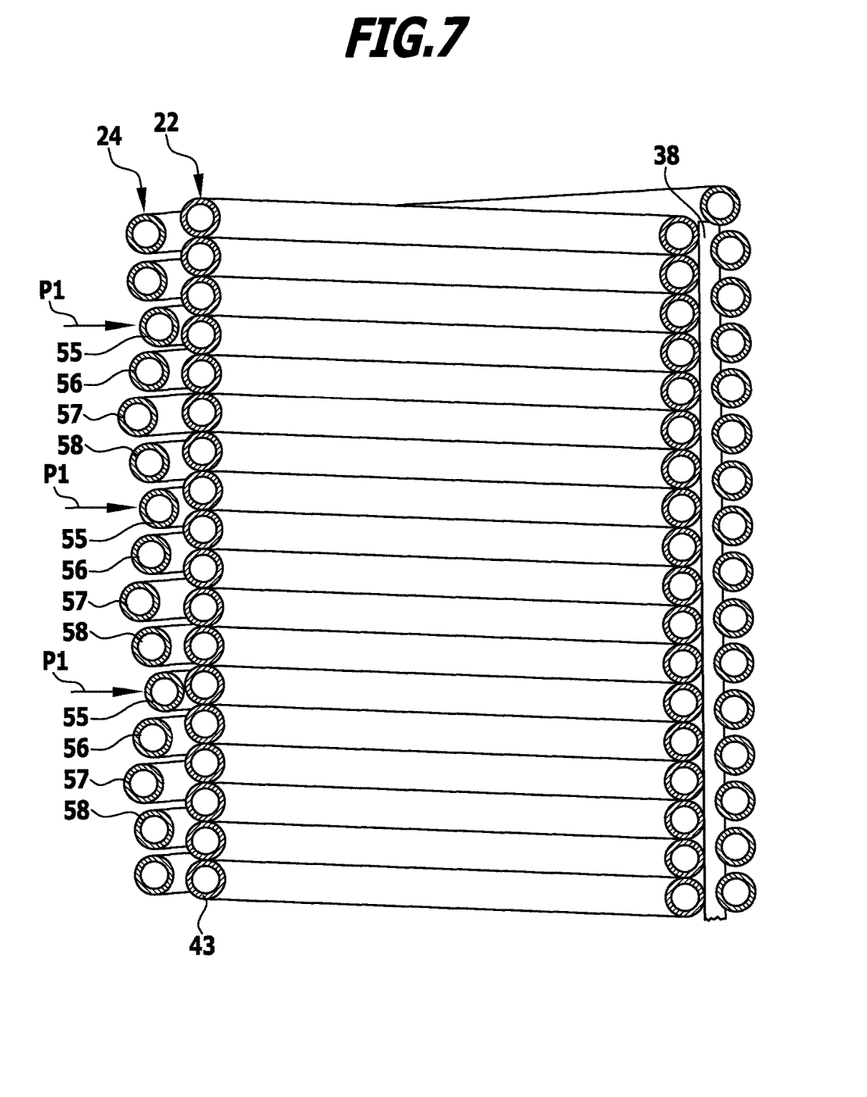
FIG. 7 shows an enlarged partially sectional view of the heat exchanger from FIG. 2 in the longitudinal direction.

A radially offset arrangement of individual turn sections between the spacers 38 to 41 is a consequence of the radial deformation of turns of the outer heating coil 24. This will be clear, in particular, from FIG. 7 and enables improved heat transfer from the heated air in the combustion chamber 26 to the cleaning liquid flowing through the heat exchanger 20. The heat exchanger 20 is, therefore, distinguished by a high degree of efficiency. The manufacture of the heat exchanger 20 is relatively simple. Only four spacers 38 to 41, which are of identical construction, are used in the illustrated embodiment. First a cylindrical inner heating coil 22 and then a cylindrical outer heating coil 24 is wound from the pipe 43. An oval deformation of individual turns of the outer heating coil 24 can be easily achieved by subsequent pressing operations.

Instead of deforming the outer heating coil 24 in individual turn sections, it is provided in a second manufacturing method in accordance with the invention that the different spacings which the outer heating coil has in individual turn sections from the inner heating coil are already achieved during manufacture of the outer heating coil 24. For this purpose, when winding the pipe 43 onto the inner heating coil 22 and the spacers 38, 39, 40 and 41, a greater or lesser tensile stress is exerted in individual turn sections than in the adjacent turn sections. By changing the tensile stress that is exerted on the pipe 43, a smaller or larger radial spacing from the inner heating coil 22 can be achieved in the region between two spacers immediately adjacent to each other. It is also possible to use preferably crescent-shaped winding aids, which are placed against the outer side of the inner heating coil 22 so that the pipe 43 can be supported thereon during the winding. By using winding aids of different widths, different radial spacings between the outer heating coil 24 and the inner heating coil 22 can be easily achieved in individual turn sections between adjacent spacers. A deforming operation after manufacture of the outer heating coil 24 can thereby be dispensed with.

That which is claimed:

1. A heat exchanger for heating a liquid, in particular, for high-pressure cleaners, comprising an inner and an outer heating coil which each have a plurality of turns and which together form a double-pipe spiral, and comprising spacers which are arranged between the inner heating coil and the outer heating coil and are distributed over the circumference of the inner heating coil, wherein at least one turn of the outer heating coil comprises between two spacers immediately adjacent to each other a first turn section in which the radial spacing from the inner heating coil is smaller or larger than in the region of the spacers;
   wherein a total of four spacers are arranged between the inner heating coil and the outer heating coil;
   wherein the spacers are uniformly distributed over the circumference of the inner heating coil;
   wherein at least one turn of the outer heating coil comprises a first turn section, a second turn section, a third turn section, and a fourth turn section;
   wherein each of the first, second, third and fourth turn sections extend between two spacers which are positioned immediately adjacent to each other in the circumferential direction;
   wherein the third turn section is diametrically opposed to the first turn section;
   wherein the second turn section follows the first turn section in the circumferential direction;
   wherein the fourth turn section precedes the first turn section in the circumferential direction;
   wherein in the first turn section, the outer heating coil assumes a smaller radial distance from the inner coil than in the region of the third turn section; and
   wherein in the second and fourth turn section, the outer heating coil assumes a greater radial distance from the inner heating coil than in the third turn section.

2. The heat exchanger in accordance with claim 1, wherein several turns of the outer heating coil each comprise between two spacers immediately adjacent to each other a first turn section in which the radial spacing from the inner heating coil is smaller or larger than in the region of the spacers.

3. The heat exchanger in accordance with claim 1, wherein several turns of the outer heating coil each comprise a first turn section in which the spacing from the inner heating coil is smaller or larger than in the region of the spacers, the first turn sections of at least two turns being arranged so as to be offset from each other in the circumferential direction of the outer heating coil.

4. The heat exchanger in accordance with claim 3, wherein the first turn sections of the at least two turns are arranged so as to be offset from each other through 270°.

5. The heat exchanger in accordance with claim 1, wherein several turns of the outer heating coil each comprise in the same circumferential region a first turn section in which the radial spacing from the inner heating coil is smaller or larger than in the region of the spacers.

6. The heat exchanger in accordance with claim 1, wherein at least one turn of the outer heating coil comprises two turn sections following each other in the circumferential direction of the outer heating coil, which are each arranged between two spacers immediately adjacent to each other and in which the turn assumes different radial spacings from the inner heating coil.

7. The heat exchanger in accordance with claim 1, wherein at least one turn of the outer heating coil has in a first turn section between two spacers immediately adjacent to each other in the circumferential direction a smaller radial spacing from the inner heating coil than in the region of the two spacers, and the first turn section is followed in the circumferential direction of the outer heating coil by a second turn section in which the radial spacing from the inner heating coil is larger than in the region of the two spacers.

8. The heat exchanger in accordance with claim 1, wherein the spacers define over their entire length a constant spacing between the inner and the outer heating coil.

9. The heat exchanger in accordance with claim 1, wherein the spacers are of identical configuration.

10. The heat exchanger in accordance with claim 1, wherein the radial spacing which the outer heating coil assumes from the inner heating coil in the at least one first turn section is at least 10% of the radial spacing which the outer heating coil assumes from the inner heating coil in the region of the spacers delimiting the first turn section (64, 64a).

11. The heat exchanger in accordance with claim 1, wherein the inner heating coil is of circular-cylindrical configuration.

12. The heat exchanger in accordance with claim 1, wherein the outer heating coil comprises a first partial longitudinal region in which the at least one first turn section is arranged, and the first partial longitudinal region is followed in the longitudinal direction of the outer heating coil by a second partial longitudinal region in which the outer heating coil has a constant spacing from the inner heating coil.

13. The heat exchanger in accordance with claim 12, wherein the turns of the inner heating coil which are arranged at the level of the first partial longitudinal region lie directly against one another.

14. The heat exchanger in accordance with claim 12, wherein at least some of the turns of the inner heating coil which are arranged at the level of the second partial longitudinal region are arranged at an axial spacing from one another.

15. The heat exchanger in accordance with claim 12, wherein at least some turns of the outer heating coil in the first partial longitudinal region are arranged at an axial spacing from one another.

16. The heat exchanger in accordance with claim 15, wherein the outer heating coil is wound from a pipe, at least two turns of the outer heating coil in the first partial longitudinal region being arranged at an axial spacing from each other which is at least as large as the outer diameter of the pipe.

* * * * *

UNITED STATES PATENT AND TRADEMARK OFFICE
CERTIFICATE OF CORRECTION

PATENT NO. : 9,841,244 B2  
APPLICATION NO. : 14/072101  
DATED : December 12, 2017  
INVENTOR(S) : Boehm et al.

Page 1 of 1

It is certified that error appears in the above-identified patent and that said Letters Patent is hereby corrected as shown below:

On the Title Page

Item (56), under the heading "References Cited," under the title "FOREIGN PATENT DOCUMENTS," the second entry is cited incorrectly. It should appear as follows:

FOREIGN PATENT DOCUMENTS
DD     5679     10/1953

Signed and Sealed this
Thirty-first Day of July, 2018

Andrei Iancu
*Director of the United States Patent and Trademark Office*